US012597136B2

(12) United States Patent
Al-Mallahi et al.

(10) Patent No.: US 12,597,136 B2
(45) Date of Patent: Apr. 7, 2026

(54) APPARATUS AND METHOD OF RECORDING A STORAGE LOCATION BY SIZE FOR HARVESTED TUBERS

(71) Applicant: Dalhousie University, Halifax (CA)

(72) Inventors: Ahmad Al-Mallahi, Truro (CA); Ighodaro Emwinghare, Truro (CA); Colton Campbell, Truro (CA)

(73) Assignee: Dalhousie University, Halifax (CA)

( * ) Notice: Subject to any disclaimer, the term of this patent is extended or adjusted under 35 U.S.C. 154(b) by 327 days.

(21) Appl. No.: 18/524,041

(22) Filed: Nov. 30, 2023

(65) Prior Publication Data

US 2025/0022126 A1 Jan. 16, 2025

Related U.S. Application Data

(60) Provisional application No. 63/526,527, filed on Jul. 13, 2023.

(51) Int. Cl.
G06T 7/00 (2017.01)
G06T 7/11 (2017.01)
(Continued)

(52) U.S. Cl.
CPC .............. G06T 7/0012 (2013.01); G06T 7/11 (2017.01); G06T 7/12 (2017.01); G06T 7/136 (2017.01);
(Continued)

(58) Field of Classification Search
CPC .... G06T 7/11; G06T 7/12; G06T 7/62; G06V 10/255; G06V 10/26; G06V 20/68; A01D 33/08
See application file for complete search history.

(56) References Cited

U.S. PATENT DOCUMENTS 7,218,775 B2 5/2007 Kokko et al.
9,091,623 B2 7/2015 Beaty et al.
(Continued)

FOREIGN PATENT DOCUMENTS

CN 106629101 A 5/2017
EP 4060608 A1 * 9/2022 ............. G06V 20/70
(Continued)

OTHER PUBLICATIONS

Dolata, Przemysław et al., "Instance segmentation of root crops and simulation-based learning to estimate their physical dimensions for on-line machine vision yield monitoring," Computers and Electronics in Agriculture, vol. 190 (2021), 106451, ISSN 0168-1699, Available: https://doi.org/10.1016/j.compag.2021.106451.(https://www.sciencedirect.com/science/article/pii/S0168169921004683), 12 pages.
(Continued)

*Primary Examiner* — Benjamin O Dulaney
(74) *Attorney, Agent, or Firm* — SMART & BIGGAR LP

(57) ABSTRACT

An apparatus and a method of determining a storage location by size for harvested tubers deposited by a bin piler are provided. The method may comprise: capturing one or more images of the harvested tubers; segmenting individual tuber depictions visible in the images; determining one or more shape characteristics for a plurality of the individual tuber depictions; identifying one or more unoccluded tuber depictions by determining that at least one of the individual tuber depictions is an unoccluded tuber depiction based on the shape characteristics of that individual tuber depiction; measuring a size of tubers corresponding to at least one of the unoccluded tuber depictions; attributing an average size to at least tubers corresponding to the occluded tuber depictions based on the measured size; determining the storage location of the harvested tubers based in part on bin piler (Continued)

location data; and recording in memory the storage location and average size.

20 Claims, 7 Drawing Sheets

(51) Int. Cl.

| | |
|---|---|
| *G06T 7/12* | (2017.01) |
| *G06T 7/136* | (2017.01) |
| *G06T 7/62* | (2017.01) |
| *G06V 10/20* | (2022.01) |
| *G06V 10/26* | (2022.01) |
| *G06V 10/82* | (2022.01) |
| *G06V 20/68* | (2022.01) |

(52) U.S. Cl.
CPC .............. *G06T 7/62* (2017.01); *G06V 10/255* (2022.01); *G06V 10/267* (2022.01); *G06V 10/82* (2022.01); *G06V 20/68* (2022.01); *G06T 2207/20084* (2013.01); *G06T 2207/30004* (2013.01)

(56) References Cited

U.S. PATENT DOCUMENTS

| | | | | |
|---|---|---|---|---|
| 12,022,768 | B1* | 7/2024 | Li | ........................... A01D 17/08 |
| 2014/0056482 | A1* | 2/2014 | Burgstaller | ........... B07C 5/3422 |
| | | | | 382/110 |
| 2018/0042176 | A1 | 2/2018 | Obropta et al. | |
| 2018/0047177 | A1* | 2/2018 | Obropta | .................. G06T 17/20 |
| 2022/0132737 | A1* | 5/2022 | Anderson | .............. G06V 10/48 |
| | | | | 56/10.2 E |
| 2022/0156917 | A1* | 5/2022 | Yuan | ........................ G06N 3/04 |
| 2022/0164989 | A1* | 5/2022 | Knopf | .................... G06V 20/68 |
| 2022/0270238 | A1* | 8/2022 | Mc Donnell | .......... G06V 20/52 |
| 2022/0331841 | A1* | 10/2022 | Filler | .................. G06K 7/1482 |
| 2022/0391615 | A1 | 12/2022 | Machefer et al. | |
| 2022/0394922 | A1 | 12/2022 | Gururajan et al. | |
| 2023/0118339 | A1* | 4/2023 | DeMaster | ................ A23B 7/16 |
| | | | | 426/232 |
| 2023/0214982 | A1* | 7/2023 | Michel | ................. G06V 10/255 |
| | | | | 382/110 |
| 2024/0260499 | A1* | 8/2024 | Kremesec | ........... A01B 79/005 |

FOREIGN PATENT DOCUMENTS

| | | |
|---|---|---|
| WO | 2018112615 A1 | 6/2018 |
| WO | 2023084116 A1 | 5/2023 |

OTHER PUBLICATIONS

Greentronics, "RiteTrace Potato Truck Tracking System," Rev. 4, Feb. 7, 2017, Available: https://greentronics.com/wp-content/uploads/2021/08/Rite-Trace-Product-Overview.pdf, 6 pages.

Smith, Lyndon Neal et al., "Innovative 3D and 2D machine vision methods for analysis of plants and crops in the field," Computers in Industry, vol. 97 (2018), pp. 122-131, ISSN 0166-3615, Available: https://doi.org/10.1016/j.compind.2018.02.002. (https://www.sciencedirect.com/science/article/pii/S0166361517305663).

"Extended European Search Report," dated May 8, 2024, EP Application No. 23213758.8, 10 pages.

Gamal, Elsmary et al: "In-line sorting of irregular potatoes by using automated computer-based machine vision system", Journal of Food Engineering, Elsevier, Amsterdam, NL, vol. 112, No. 1, Mar. 21, 2012 (Mar. 21, 2012), pp. 60-68, XP028483507, ISSN: 0260-8774, DOI: 10.1016/J.JFOODENG.2012.03.027 [retrieved on Mar. 29, 2012].

Si, Yongsheng et al: "Potato Tuber Length-Width Ratio Assessment Using Image Analysis", American Journal of Potato Research, the Association, Orono, ME, US, vol. 94, No. 1, Nov. 4, 2016 (Nov. 4, 2016), pp. 88-93, XP036169048, ISSN: 1099-209X, DOI: 10.1007/S12230-016-9545-1 [retrieved on Nov. 4, 2016].

* cited by examiner

304

308

312

APPARATUS AND METHOD OF RECORDING A STORAGE LOCATION BY SIZE FOR HARVESTED TUBERS

CROSS-REFERENCE TO RELATED APPLICATIONS

This application claims the benefit of U.S. Provisional Application No. 63/526,527 filed on Jul. 13, 2023, which is incorporated by reference herein in its entirety.

FIELD

This document relates to apparatuses and methods of recording a storage location by size for harvested tubers deposited by a bin piler.

BACKGROUND

Tubers are a type of enlarged structure used as storage organs for nutrients in some plants. Tuber crops are some of the most important crops in the world and form a large portion of the world's food supply. Tubers include root tubers (e.g., potatoes, yams) and stem tubers (e.g., sweet potatoes, cassava).

In agricultural applications, tubers may often be graded based on their physical attributes, such as size. The intended application and the pricing of the tubers may be based on the grading results. For example, large and elongated potatoes that can be used for producing French fries and chips may be priced higher. Smaller, irregular shaped potatoes that can be used for other processed products, such as mashed potatoes or potato flakes may be priced lower.

Timely grading of tubers following harvest can enable appropriate pricing and logistical operations (storage, processing, and distribution). This can improve operational efficiency and reduce post-harvest waste.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

According to some aspects, a method of recording a storage location by size for harvested tubers deposited by a bin piler is provided. The method may comprise: capturing, using a camera, one or more images of the harvested tubers moving on a conveyor towards the bin piler; segmenting, by a processor, individual tuber depictions visible in the one or more images; determining, by the processor, one or more shape characteristics for a plurality of the individual tuber depictions; identifying, by the processor, one or more unoccluded tuber depictions by determining that at least one of the individual tuber depictions is an unoccluded tuber depiction based on the one or more shape characteristics of that individual tuber depiction, the tuber depictions including occluded tuber depictions; measuring, by the processor, a size of tubers corresponding to at least one of the unoccluded tuber depictions; attributing, by the processor, an average size to at least tubers corresponding to the occluded tuber depictions based on the size of tubers corresponding to the at least one of the unoccluded tuber depictions; determining, by the processor, the storage location of the harvested tubers based at least in part on bin piler location data; and recording in memory the storage location of the harvested tubers and the average size.

According to some aspects, an apparatus for recording a storage location by size for harvested tubers is provided. The apparatus may comprise a bin piler, a conveyor, a camera, a location system, and a control system. The bin piler may be configured to deposit the harvested tubers at the storage location. The conveyor may be configured to move the harvested tubers towards the bin piler. The camera may be configured to capture one or more images of the harvested tubers moving on the conveyor. The location system configured to generate bin piler location data indicating a location of the bin piler. The control system may have at least one processor and a memory. The at least one processor may be configured to collectively: receive the one or more images from the camera; segment individual tuber depictions visible in the one or more images; determine one or more shape characteristics for a plurality of the individual tuber depictions; identify one or more unoccluded tuber depictions by determining that at least one of the individual tuber depictions is an unoccluded tuber depiction based on the one or more shape characteristics of that individual tuber depiction, the tuber depictions including occluded tuber depictions; measure a size of tubers corresponding to at least one of the unoccluded tuber depictions; attribute an average size to at least tubers corresponding to the occluded tuber depictions based on the size of tubers corresponding to the at least one of the unoccluded tuber depictions; determine the storage location of the harvested tubers based at least in part on bin piler location data; and record in the memory the storage location of the harvested tubers and the average size.

According to some aspects, a non-transitory computer-readable medium comprising instructions executable by a processor is provided. The instructions when executed may configure the processor to: receive, from a camera, one or more images of harvested tubers moving on a conveyor towards a bin piler; segment individual tuber depictions visible in the one or more images; determine one or more shape characteristics for a plurality of the individual tuber depictions; identify one or more unoccluded tuber depictions by determining that at least one of the individual tuber depictions is an unoccluded tuber depiction based on the one or more shape characteristics of that individual tuber depiction, the tuber depictions including occluded tuber depictions; measure a size of tubers corresponding to at least one of the unoccluded tuber depictions; attribute an average size to at least tubers corresponding to the occluded tuber depictions based on the size of tubers corresponding to the at least one of the unoccluded tuber depictions; determine a storage location of the harvested tubers based at least in part on bin piler location data; and record in memory the storage location of the harvested tubers and the average size.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
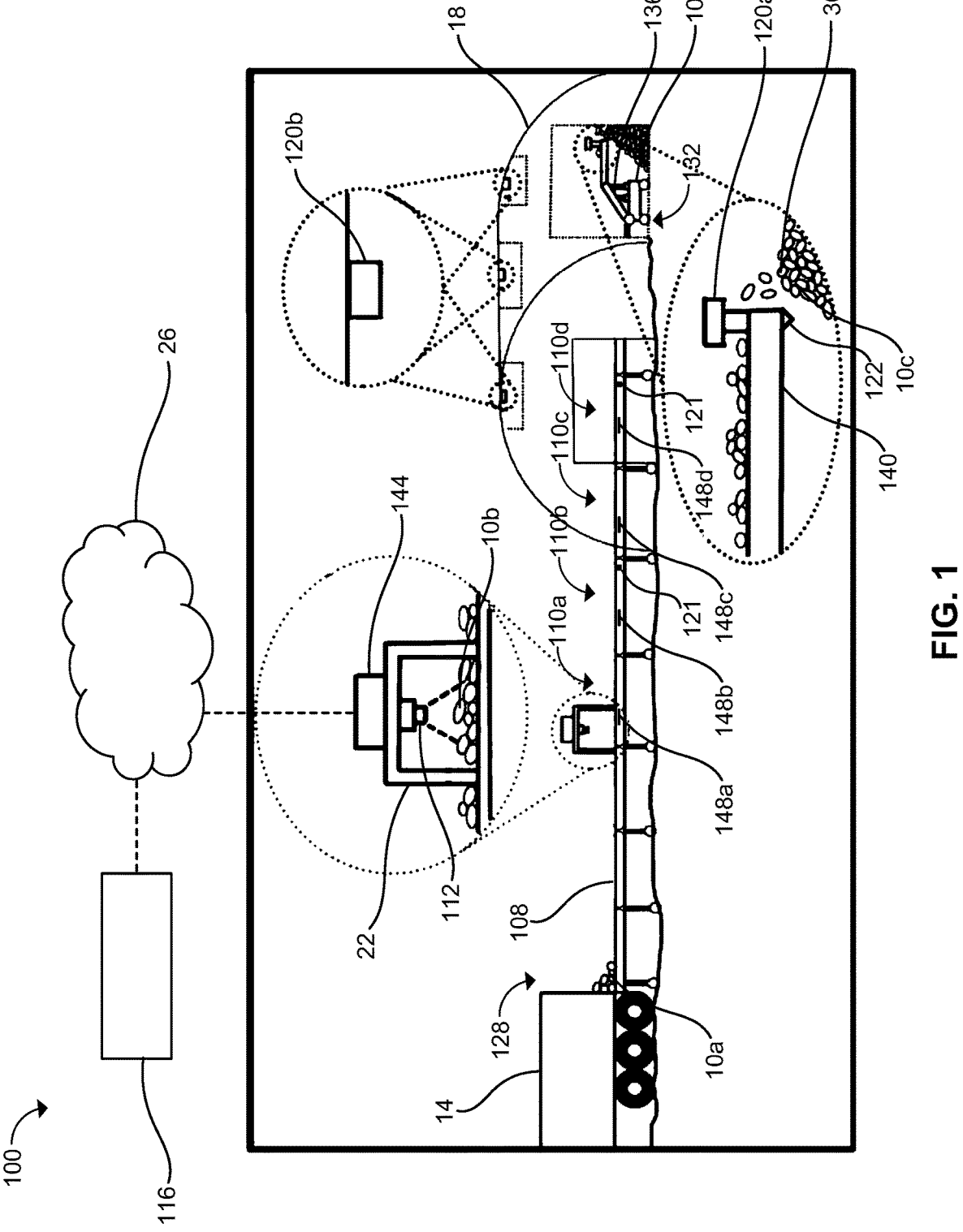
FIG. 1 is a schematic illustration of an apparatus for recording a storage location by size for harvested tubers, in accordance with an embodiment.

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., $112a$, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., 112).

As used herein and in the claims, "up", "down", "above", "below", "upwardly", "vertical", "elevation", "upper", "lower" and similar terms are in reference to a directionality generally aligned with (e.g., parallel to) gravity. However, none of the terms referred to in this paragraph imply any particular alignment between elements. For example, a first element may be said to be "vertically above" a second element, where the first element is at a higher elevation than the second element, and irrespective of whether the first element is vertically aligned with the second element.

Timely grading of tubers after harvest can require significant labor resources. Harvested tubers may be transported and deposited into a storage facility using conveyors with a high throughput. For example, the conveyor throughput may be greater than 200 kg per minute. Manually measuring a size of every harvested tuber, or even a small fraction of every harvested tuber, can be costly, time-consuming and labor-intensive, requiring a significant workforce and time investment. The disclosed apparatus and methods can reduce (or nearly eliminate) the cost, time, and labor requirements by automating the size measurement and location tracking of harvested tubers.

Timely and accurate grading of the harvested tubers can be challenging. The conveyors used for transporting the harvested tubers into storage can be narrow and cause clustering and occlusion of the tubers. For example, where stacks of tubers form on the conveyors, top level tubers will lie over lower level tubers and thereby occlude (i.e. block visibility) at least portions of the lower level tubers. The occluded portions may prevent accurate size assessment when using imaging to assist with this process. Other challenges can include mechanical vibration, ambient light, and the presence of foreign objects (e.g., dirt), which can vary according to the sections of the field from which the tubers were harvested.

The disclosed apparatus and methods can improve the accuracy of size measurements by differentiating fully visible (i.e., nonoccluded) tubers from occluded tubers in images. A sampling of the nonoccluded tubers may be selected for size measurement and an average size can be attributed to the nearby harvested tubers (including occluded tubers) based on the size measurements of the sampled unoccluded tubers. This avoids inaccuracies associated with assessing the size of occluded tubers.

Referring now to FIG. 1, shown therein is a schematic illustration of an apparatus 100 for recording a storage location by size for harvested tubers 10. In the illustrated example, apparatus 100 includes a bin piler 104, a conveyor 108, a camera 112, a control system 116, and a location system 120.

Harvested tubers 10*a* may be deposited at a first end 128 of conveyor 108. For example, harvested tubers may be transported from a field and deposited at first end 128 by a truck 14. A second end 132 of conveyor 108 can be connected to bin piler 104. Conveyor 108 may have any suitable design to move harvested tubers 10 from first end 128 towards bin piler 104 located at second end 132. For example, conveyor 108 may be a belt conveyor or a motorized roller conveyor.

Conveyor 108 may include one or more conveyor segments. For example, conveyor 108 may include a single straight conveyor segment that extends from first end 128 to second end 132. In the illustrated embodiment, conveyor 108 is shown including multiple conveyor segments (e.g., conveyor segments 110*a*-110*d* extending from grading station 22 to storage facility 18). Each conveyor segment 110 may extend along the same or different directions as adjacent segments and/or may incline the same or differently from adjacent segments. In some examples, each conveyor segments may move at the same or different speeds as the adjacent segments.

Optionally, apparatus 100 may include one or more sensors 148 configured to measure the speed(s) of conveyor segments 110. Apparatus 100 may include any suitable number of sensors 148 (e.g., 1 to 100 sensors). For example, apparatus 100 may include one speed sensor 148 for each conveyor segment 110 capable of moving at a different speed from adjacent segment(s) 110. In the illustrated embodiment, sensors 148*a*-148*d* are configured to measure the speeds of conveyor segments 110*a*-110*d* respectively.

Sensor 148 may have any design suitable for measuring the speed of conveyor segments 110. For example, sensor 148 can be a Reed 59060 magnetic shaft sensor that can provide non-contact measurement of the conveyor speed. The Reed 59060 magnetic shaft sensor can measure the revolutions per second of any of the shafts around which the conveyor belt rotates. The speed of the conveyor segment can be determined based on the measured revolutions per second and the radius of the shaft according to Equation 1 below:

$$\text{Conveyor speed}\,(m\,/\,s) = \qquad\text{(Equation 1)}$$
$$\text{measured revolutions}\,(1\,/\,s) \times 2\pi \times \text{shaft radius}(m)$$

In other examples, different sensors may be used. Sensor 148 may provide measured conveyor speed data to control system 116 by wire or wirelessly (e.g. using LoRa, WiFi®, or Bluetooth™). Measuring the speed(s) of conveyor segment(s) 110 allows control system 116 to more accurately predict when a tuber passing grading station 22 will be discharged from bin piler 104 into the pile of tubers 10*c* in storage facility 18. This allows the storage location 30 of that tuber within storage facility 18 to be more accurately determined and recorded. For example, the speed(s) of conveyor segment(s) 110 may vary over time depending on factors such as the density of tubers being carried by the conveyor segment(s) 110. Accordingly, the transit time between grading station 22 and the discharge end of bin piler 104 may also vary over time. Such changes are capable of being accounted for by continuously measuring the speed(s) of conveyor segment(s) 10.

In other embodiments, the speed(s) of conveyor segment(s) 110 is constant or the transit time from grading station 22 to the discharge end of bin piler 104 is constant, such that the time when tubers will be discharged from bin piler 104 after passing grading station can be accurately predicted without measuring the speed(s) of conveyor segment(s) 110 (i.e. without use of sensor(s) 148).

A grading station 22 may be installed along conveyor 108 for inspecting and grading harvested tubers. Camera 112 may be positioned at grading station 22. Camera 112 can be any suitable camera for capturing images of harvested tubers 10*b* moving along conveyor 108. In some embodiments, camera 112 can be an RGB camera that captures images of the harvested tubers in the visible range of the electromagnetic spectrum. In other embodiments, camera 112 can be any other camera, for example, a hyperspectral camera that can capture images in visible and infrared (IR) range of the electromagnetic spectrum. A hyperspectral camera may provide additional information compared with an RGB camera, for example, information regarding internal defects of the imaged tubers. An RGB camera may enable lower cost and system complexity compared with a hyperspectral camera.

Camera 112 may provide captured images (e.g., individually captured photos or selected video frames) to control system 116 directly (e.g., by wire or wirelessly) or indirectly via a network 26. Network 26 may include a communication network such as the Internet, a Wide-Area Network (WAN), a Local-Area Network (LAN), or another type of network. Camera 112 may communicate with network 26 using communication module 144. In some examples, communication module 144 may be integrated into camera 112. In other examples, communication module 144 may be an independent module that is communicatively coupled to camera 112 (e.g., a Wi-Fi or network dongle).

In some embodiments, control system 116 may control the image capture rate of camera 112 based on the positioning and image capture parameters of camera 112, and a measured speed of conveyor 108. For example, control system 116 may control the image capture rate of camera 112 based on conveyor speed data received from a sensor 148 associated with conveyor segment 110*a* in the field of view of camera 112. The image capture rate of camera 112 may be controlled to avoid capturing multiple images that include the same tubers.

For example, the field of view of camera 112 may include a 1.3 m length of conveyor 108 based on the positioning and image capture parameters of camera 112. Accordingly, this length of conveyor 108 may be included in each image captured by camera 112. For a conveyor speed of 1 m/s, control system may set the image capture rate of camera 112 to 0.5 images per section (i.e., 1 image captured per 2 seconds) to avoid capturing the same tuber in multiple images. For a conveyor speed of 0.5 m/s, control system may set the image capture rate of camera 112 to 0.25 images per second (i.e., 1 image captured per 4 seconds) to avoid capturing the same tuber in multiple images. Equation 2 below provides a relationship between the image capture rate (f) in images per second and conveyor speed (v) in meters per second for the example case of a 1.3 m conveyor length being captured in each image—

$$f = 0.5\,v \qquad \text{(Equation 2)}$$

Bin piler 104 can have any design suitable for depositing the harvested tubers into storage facility 18. For example, bin piler 104 can include an elevator 136 and boom 140. Elevator 136 can control a vertical elevation from which the harvested tubers are discharged from bin piler 104. Boom 140 can control a lateral (e.g. horizontal X-Y) position of discharge of the harvested tubers from bin piler 104. The combination of elevator 136 and boom 140 can control storage location 30 of the harvested tubers 10c. Other bin piler designs may have the alternative and/or additional movable elements for controlling the three-dimensional location at which the harvested tubers are discharged into storage facility 18.

Location system 120 may use any suitable technology to track the movement of bin piler 104 and generate bin piler location data. For example, location system 120 may track the movement of bin piler 104 using dead reckoning or distance measurement to nearby anchor nodes (i.e., nodes with known fixed positions, for example, WiFi® access points, Bluetooth® beacons or Ultra-Wideband beacons).

In the illustrated schematic, location system 120 includes a tag 120a positioned at the discharge end of bin piler 104 and multiple anchor tags 120b (three anchor tags shown in FIG. 1, but four or more tags is preferred to derive a 3D coordinate) positioned at known positions within storage facility 18. Each tag 120 may include an impulse radio ultra-wideband (IR-UWB) transmitter-receiver (e.g. ESP32 Ultra-Wideband board with Qorvo™ DW1000 UWB module). The location of the discharge end of bin piler 104 can be tracked in real-time based on two-way time-of-flight (TOF) measurements between tag 120a and multiple anchor tags 120b. The high bandwidth provided by IR-UWB transmitter-receivers may enable tracking of the bin piler movement with high precision in three-dimensions.

Location system 120 may provide the generated bin piler location data to control system 116 using any suitable communication technology. For example, location system 120 (e.g. tag 120a) may transmit the bin piler location data to communication module 144 using LoRa to enable low-power operation of location system 120. Alternatively or in addition, communication module 144 may provide the received bin piler location data to control system 116 using network 26. In other examples, location system 120 (e.g. tag 120a) may provide the generated bin piler location data to control system 116 directly. Alternatively or in addition to using LoRa, location system 120 may transmit the bin piler location data using other technologies, e.g., WiFi®, or by a wired connection.

Alternatively or in addition, location system 120 may include sensors that detect the inclination of elevator 136 and/or the extension of boom 140 and/or extension of one or more of conveyor segments 110. For example, one or more of conveyor segments 110 and/or bin piler boom 140 may be extendable in length to accommodate the deposit of tubers at the targeted storage location. Such variability in length may impact the accuracy of the predicted transit time from grading station 22 to the discharge end of bin piler 104 where the transit time is predicted based on measured speed(s) of conveyor segment(s) 110. In some embodiments, there may be a sensor associated with each of one or more (or all) of conveyor segments 110 that are capable of extension and/or bin piler boom 140 to determine the length(s) of these elements, whereby the predicted transit time (measured as length divided by speed for travel across each element) can be determined based on accurate lengths.

Any suitable sensors may be used to determine the present length of extendable conveyor segment(s) 110 and/or bin piler boom 140. The illustrated example shows some of conveyor segment(s) 110 including a sensor 121, which may be similar hardware to sensors 120a or 120b described above. For example, data from sensors 121 may be sent to control system 116, which may determine a 2D or 3D location of each sensor 121 and from that derive the length of the associated segments 110. Similarly, the length of bin piler boom 140 may be derived based on location data from sensor 120a and/or additional sensors.

Figure 2:
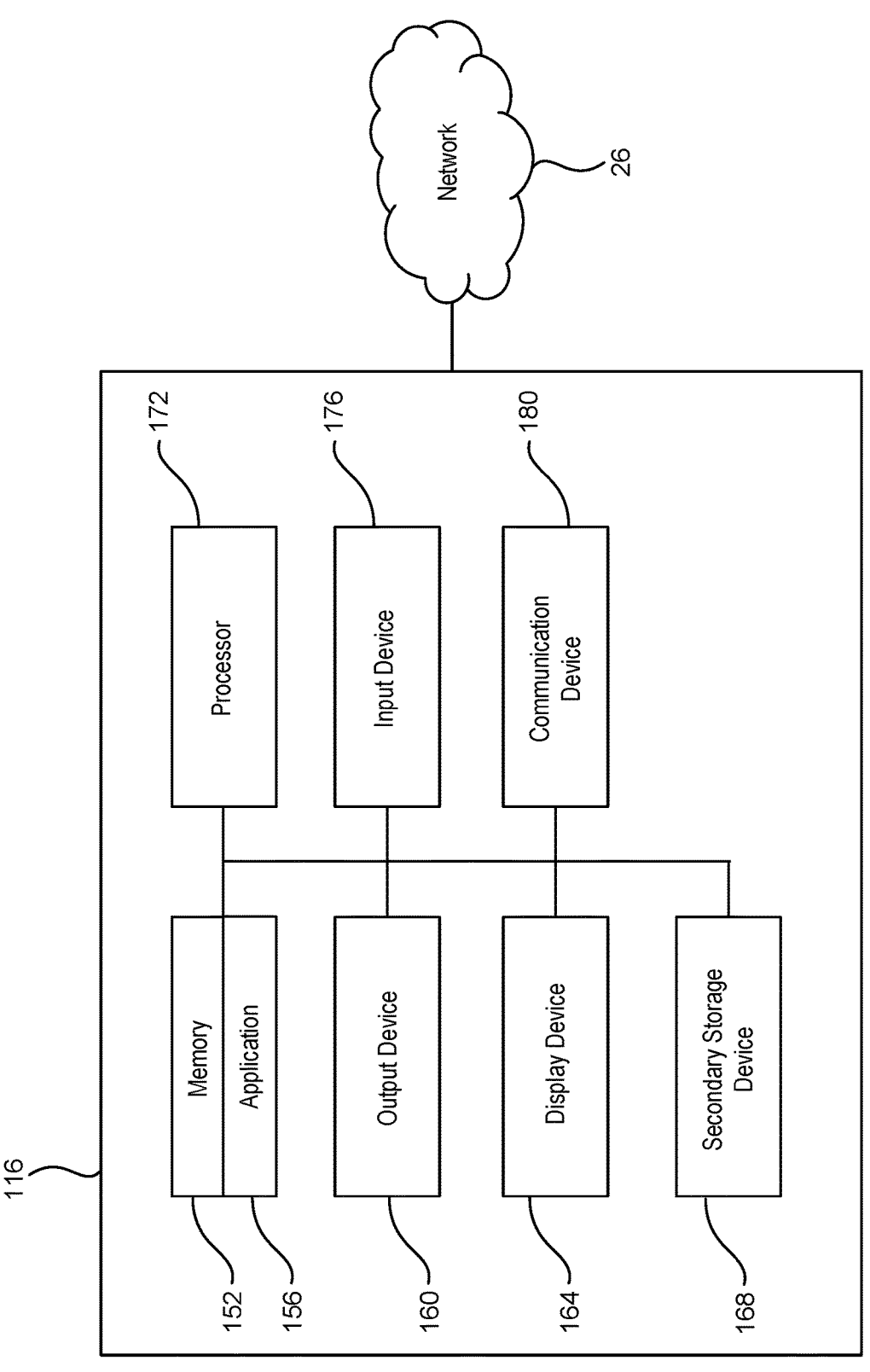
FIG. 2 is a block diagram of a control system of the apparatus of FIG. 1.

Reference is now made to FIGS. 1 and 2. FIG. 2 is a block diagram of an example control system 116. In some embodiments, control system 116 may be implemented as a server device (e.g., a remote server). In other embodiments, control system 116 may be implemented using any other suitable hardware components. For example, control system 116 may be implemented as a device that is physically integrated with grading station 22.

For the example embodiment illustrated in FIG. 2, control system 116 includes a memory 152, an application 156, an output device 160, a display device 164, a secondary storage device 168, a processor 172, an input device 176, and a communication device 180. One or more (or all) of memory 152, application 156, output device 160, display device 164, secondary storage device 168, processor 172, input device 176, and communication device 180 may be communicatively coupled by wire and/or wirelessly.

In some embodiments, control system 116 includes multiple of any one or more of memory 152, application 156, output device 160, display device 164, secondary storage device 168, processor 172, input device 176, and communication device 180. In some embodiments, control system 116 does not include one or more of applications 156, secondary storage devices 168, network connections, input devices 176, output devices 160, display devices 164, and communication devices 180.

Memory 152 can include one or more of random-access memory (RAM) and read-only memory (ROM). In some embodiments, memory 152 stores one or more applications 156 for execution by processor 172. Applications 156 correspond with software modules including computer executable instructions that when executed by one or more processors cause the one or more processors to collectively perform processing for the functions and methods described herein.

Memory 152 may store one or more machine learning models. The machine learning models may be trained to segment individual tubers visible in captured images and/or identify unoccluded tubers among the segmented individual tubers. The machine learning models may be generated and trained by control system 116. In some embodiments, control system 116 may receive a generated machine learning model from an external device (e.g., over network 26) and may train the received machine learning model. Control system 116 may perform supervised training of the received models using labeled training data. In some embodiments, control system 116 may receive a trained machine learning model from an external device (e.g., over network 26) and store the trained machine learning model in memory 152.

In some embodiments, memory 152 may also store a determined storage location and average size of the harvested tubers. The stored data may be provided to users, for example, via network 26.

Secondary storage device 168 may include any suitable non-transitory computer-readable medium including instructions executable by a processor (e.g., processor 172). For example, secondary storage device 168 can include a hard drive, floppy drive, CD drive, DVD drive, Blu-ray drive, solid state drive, flash memory or other types of non-volatile data storage. Processor(s) 172 may collectively execute instructions included on secondary storage device 168 to perform processing for the functions and methods described herein.

In some embodiments, control system 116 stores information in a remote storage device, such as cloud storage, accessible across a network, such as network 26 or another network. In some embodiments, control system 116 stores information distributed across multiple storage devices, such as memory 152 and secondary storage device 168 (i.e., each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Input device 176 can include any device for entering information into control system 116. For example, input device 176 can be a keyboard, keypad, cursor-device, touch-screen, camera, or microphone. Input device 176 can also include input ports and wireless radios (e.g., Bluetooth®, or 802.11x) for making wired and wireless connections to external devices.

Display device 164 can include any type of device for presenting visual information. For example, display device 164 can be a computer monitor, a flat-screen display, a projector or a display panel.

Output device 160 can include any type of device for presenting a hard copy of information, such as a printer for example. Output device 160 can also include other types of output devices such as speakers, for example. In at least one embodiment, output device 160 includes one or more of output ports and wireless radios (e.g., Bluetooth®, or 802.11x) for making wired and wireless connections to external devices.

Communication device 180 can have any design suitable to receive analog and/or digital inputs from, and to provide analog and/or digital outputs. In some embodiments, communication device 180 may include separate modules for analog and digital signals.

Processor(s) 172 may be any devices that can collectively execute applications, computer readable instructions or programs. The applications, computer readable instructions or programs can be stored in memory 152 or in secondary storage device 168, or can be received from remote storage accessible through network 26, for example. Processor 172 may be a high-performance general processor, a standard processor (e.g., an Intel® processor or an AMD® processor), specialized hardware (e.g., GPUs), or multiple processing devices that collectively perform the functions provided by processor 172.

FIG. 2 illustrates one example of a control system 116. In alternative embodiments, control system 116 contains fewer, additional or different components. In addition, although aspects of an implementation of control system 116 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. For example, control system 116 may include a non-transitory computer readable medium storing computer-readable instructions that when executed by processor(s) 172, configure processor(s) 172 to collectively perform method(s) described herein.

Figure 3:
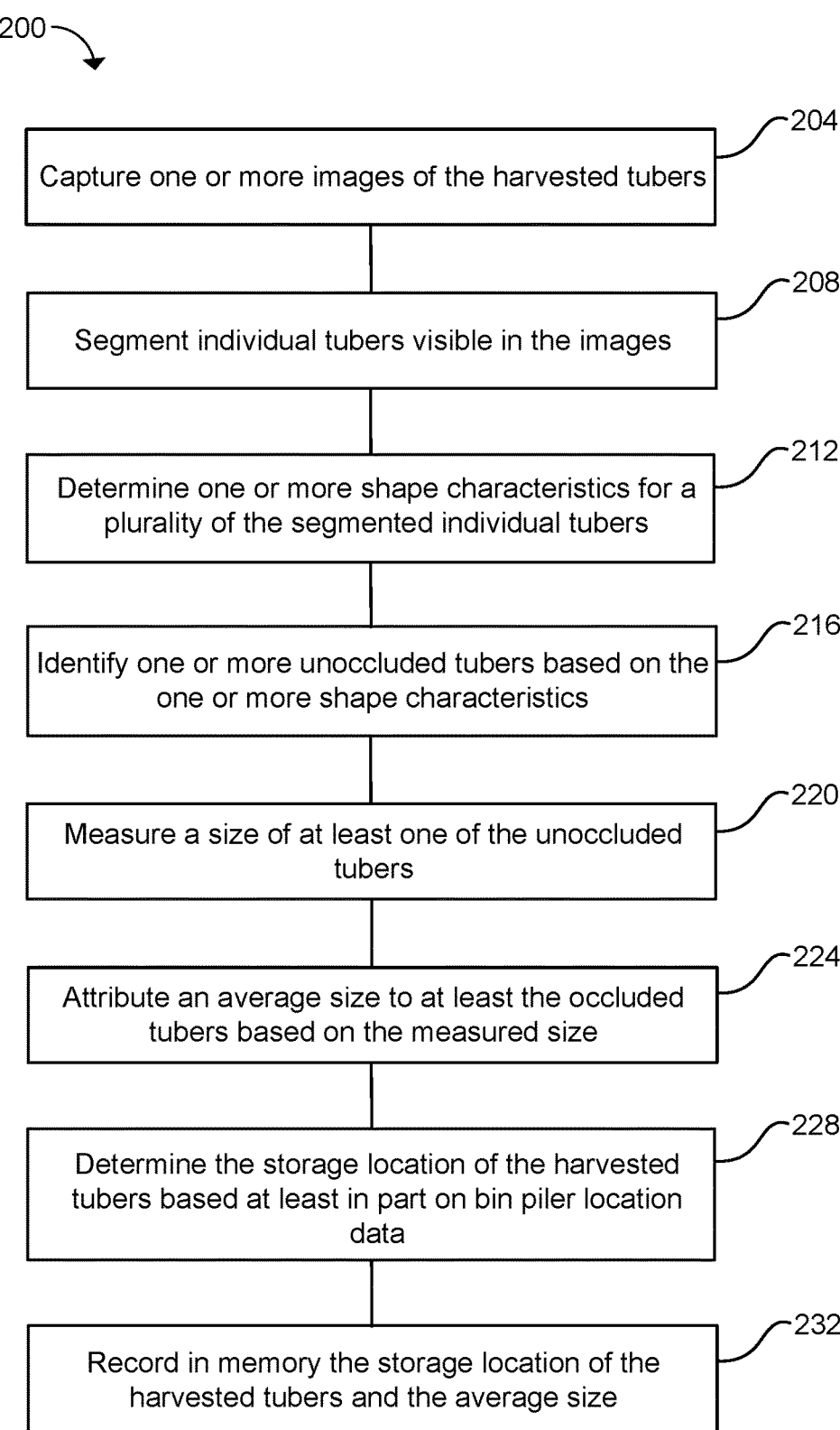
FIG. 3 is a flowchart illustrating an example method of recording a storage location by size for harvested tubers deposited by a bin piler.

Referring now to FIG. 3, shown therein is a flowchart illustrating an example method 200 of recording a storage location by size for harvested tubers deposited by a bin piler. The harvested tubers can be, for example, all the tubers harvested from a field. In some embodiments, the harvested tubers can be a portion of the tubers harvested from the field. In some examples, the portion may be defined by a time duration (e.g., harvested tubers moving on the conveyor during a prescribed (e.g., one minute or one hour) time duration or by number (e.g., a number of truckloads of tubers)).

Method 200 may be performed, for example, using apparatus 100 (FIG. 1) and reference is also made below to FIGS. 1 and 2. Method 200 may be automatically performed in response to detecting movement of conveyor 108. In some embodiments, method 200 may be performed in response to a user input or based on a stored time schedule.

In some cases, the harvested tubers may be potatoes. In other cases, the harvested tubers may be any other tubers (e.g., sweet potatoes, yams, cassava, etc.).

At 204, one or more images of harvested tubers 10 moving on a conveyor towards a bin piler may be captured. For example, the images may be captured by camera 112. Camera 112 may provide the captured images to a control system (e.g., control system 116).

In some embodiments, a portion of the harvested tubers may be imaged at 204. Imaging on a portion of the harvested tubers may provide a reduction in computational resource requirements. In other embodiments, all the harvested tubers may be imaged at 204. This may provide larger amount of data for determining the size of harvested tubers, which may allow for more accurate sizing.

At 208, individual tuber depictions visible in the captured images may be segmented. For example, processor 172 of control system 116 may segment the individual tuber depictions visible in the captured images. The individual tuber depictions may be segmented by generating a binary mask indicating a detected region of each individual tuber depiction and generating a bounding box that encompasses the detected region of that individual tuber depiction.

In some embodiments, the individual tuber depictions may be segmented using a suitable machine learning model. For example, processor 172 may segment the individual tuber depictions using a suitable machine learning model stored in memory 152.

A suitable machine learning model may be selected based on factors including accuracy, speed and computational resource requirements. In some embodiments, a Mask Region-based Convolutional Neural Network (R-CNN) model may be used to segment individual tuber depictions visible in the captured images. In other embodiments, a different model (for example, U-net) may be used to segment individual tuber depictions visible in the captured images.

Figure 4A:
FIG. 4A is an example captured image of multiple potatoes moving on a conveyor, in accordance with an embodiment.
Figure 4B:
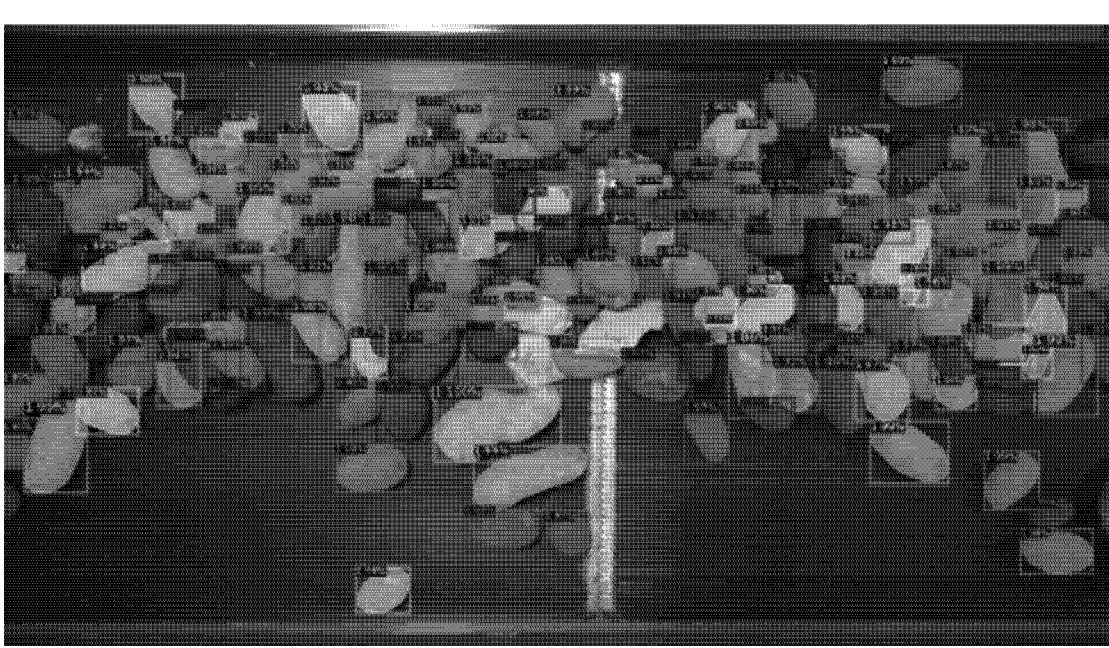
FIG. 4B is a segmentation image generated for the example captured image of FIG. 4A.

Reference is now made to FIGS. 4A and 4B. FIG. 4A shows an example captured image 304 of multiple potatoes moving on a conveyor. The moving potatoes may be clustered and some potatoes may lie over other potatoes. As can be seen in captured image 304, the clustering may cause occlusion of some of the imaged potatoes. FIG. 4B shows an example segmentation image 308 generated for example captured image 304 using a Mask R-CNN model. The trained Mask R-CNN model can receive captured image 304 as input and provide segmentation image 308 as output. Segmentation image 308 includes individual potato depictions segmented from one another (instance segmentation) and from the conveyor (semantic segmentation).

The Mask R-CNN model architecture may include a backbone stage and a head stage. In some embodiments, the backbone stage may be constructed using Feature Pyramid Network (FPN), Residual Network (ResNet), Regional Proposal Network (RPN) and a Region of Interest (ROI) align layer. The backbone stage can generate predictions of regions in the captured image that might contain tuber depictions. The head stage may include fully connected layers where the classification, bounding box and mask predictions can be generated using the region predictions from the backbone stage.

Any suitable platform may be used for implementing the Mask R-CNN model architecture. In some embodiments, the detectron2 library may be used. In other embodiments, a different platform (e.g., MMDetection) may be used.

Referring back to FIGS. 1 to 3, at 212 of method 200, one or more shape characteristics may be determined for the individual tuber depictions. For example, processor 172 may determine one or more shape characteristics for the individual tuber depictions segmented at 208.

The shape characteristics may include for example, one or more color-based feature parameters (S/N_1 and S/N_2), edge-based feature parameters (avg_val_bbox, ellipticalness, ellipse ratio, circularity, convexity defect), and/or the seven image invariant moments (H1-H7) obtained from the HuMoments method of the OpenCV Python library. Further information on these shape characteristics are provided below. In some embodiments, step 212 is omitted because the one or more shape characteristics are prestored (e.g., in memory 152 or storage device 168) and accessible to processor(s) 172 (see FIG. 2).

Figure 5A:
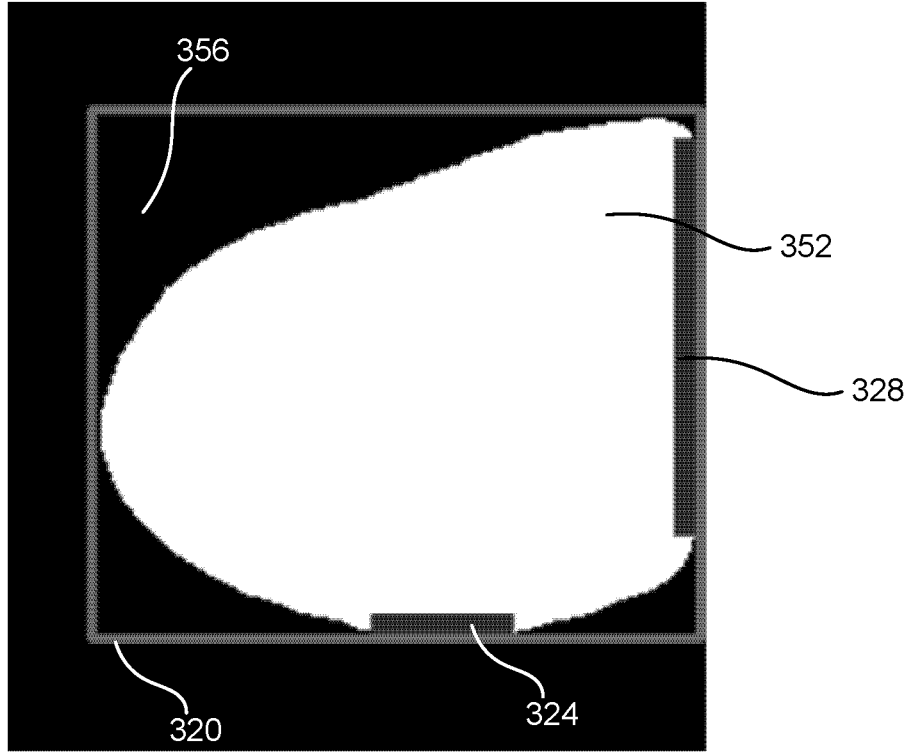
FIG. 5A shows a bounding box fitted around an example binary mask of an individual tuber depiction, in accordance with an embodiment.
Figure 5B:
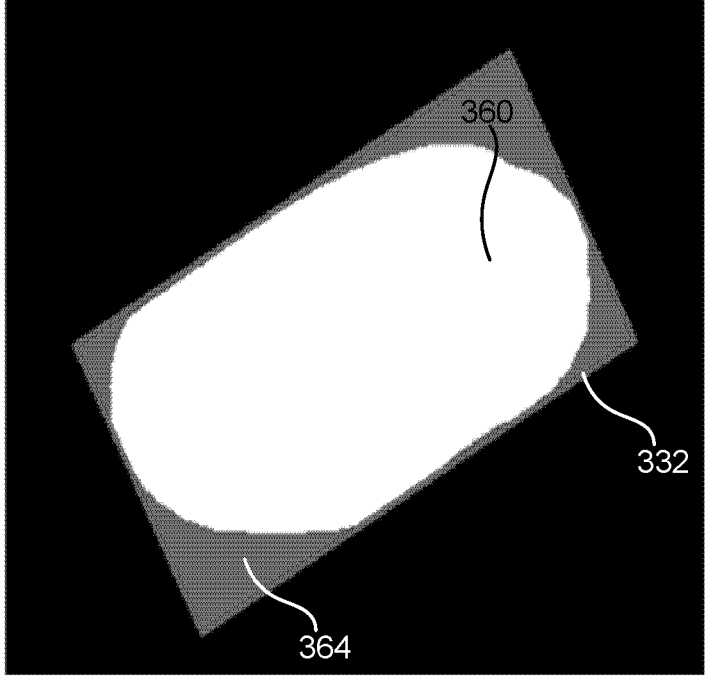
FIG. 5B shows an angle-adjusted bounding box fitted around an example binary mask of an individual tuber depiction, in accordance with an embodiment.
Figure 5C:
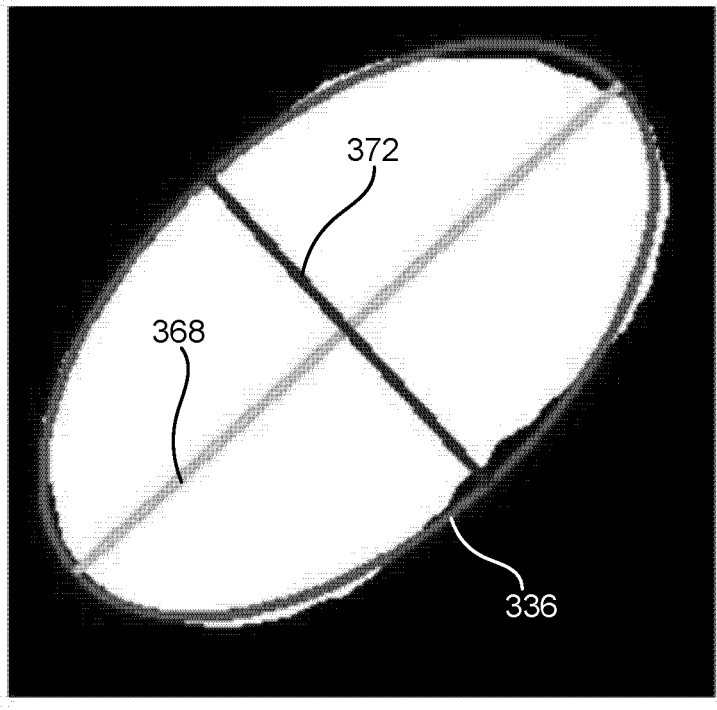
FIG. 5C shows an ellipse fitted to the external contour of the example binary mask of FIG. 5B.
Figure 5D:
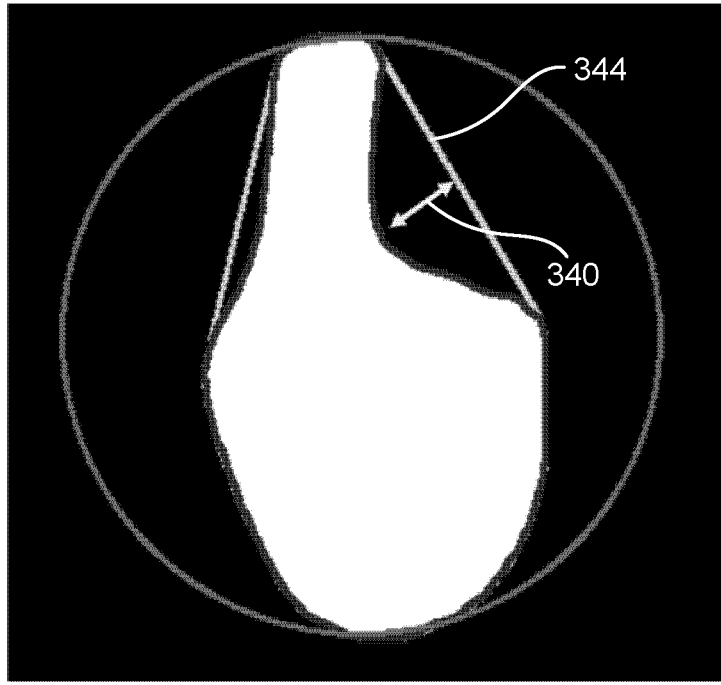
FIG. 5D shows the deviation of an example binary mask of an individual tuber depiction from its convex hull, in accordance with an embodiment.

Reference is now made to FIGS. 5A-5D. FIG. 5A shows a bounding box 320 fitted around an example binary mask of an individual tuber depiction. FIG. 5B shows an angle-adjusted bounding box 332 fitted around an example binary mask of an individual tuber depiction. FIG. 5C shows an ellipse 336 fitted to the external contour of an example binary mask of an individual tuber depiction. FIG. 5D shows the deviation 340 of an example binary mask of an individual tuber depiction from its convex hull.

The avg_val_bbox edge-based feature parameter may be determined based on an average density of tuber mask pixels along the edges of the bounding box. For example, processor 172 can compute the total number of pixels along the edges of bounding box 320 shown in FIG. 5A. Processor 172 can also compute the number of tuber mask pixels along the edges of bounding box 320 (corresponding to edge portions 324 and 328). Processor 172 may determine the avg_val_bbox edge-based feature parameter using the ratio of the tuber mask pixels along the edges of bounding box 320 to the total number of pixels along the edges of bounding box 320. A higher value for this ratio (e.g., higher than a threshold value) may indicate that the tuber represented by the binary mask is substantially truncated (e.g., by an occluding tuber or by the edge(s) of the captured image) and should be treated as an occluded tuber.

The S/N_1 color-based feature parameter may be determined based on a ratio of the number of tuber mask pixels to the total number of pixels enclosed by the bounding box. For the example bounding box 320 shown in FIG. 5A, processor 172 can compute the number of tuber mask pixels (white pixels 352) to the total number of pixels (black pixels 356 and white pixels 352) enclosed by bounding box 320.

The S/N_2 color-based feature parameter may be determined based on a ratio of the number of tuber mask pixels to the total number of pixels enclosed by the angle-adjusted bounding box. The angle-adjusted bounding box may be defined to capture the angular orientation of the tuber mask. For the example angle-adjusted bounding box 332 shown in FIG. 5B, processor 172 can compute the number of tuber mask pixels (white pixels 360) to the total number of pixels (grey pixels 364 and white pixels 360) enclosed by angle-adjusted bounding box 332. The angle-adjusted bounding box may be smaller than a corresponding unadjusted bounding box and result in the S/N_2 parameter value being higher than the corresponding S/N_1 parameter value.

The ellipticalness edge-based feature parameter may be determined based on the ratio of the area of an ellipse (fitted to the external contour of tuber mask pixels) to the number of tuber mask pixels. For example, processor 172 can compute the area of ellipse 336 fitted to the external contours of the tuber mask pixels shown in FIG. 5C. Processor 172 may compute the area of ellipse 336 using Equation 3 below—

$$A = \pi a\, b/4 \qquad \text{(Equation 3)}$$

where a is the length of the major axis 368 of ellipse 336, b is the length of the minor axis 372 of ellipse 336 and A is the computer area of ellipse 336. Processor 172 may determine the ratio of area A to the number of tuber mask pixels to determine the ellipticalness.

The ellipse ratio edge-based feature parameter may be determined based on the ratio of the number of tuber mask pixels enclosed by the contour of the fitted ellipse to the total number of tuber mask pixels. For example, processor 172 can compute the number of tuber mask pixels enclosed by the contour of ellipse 336 shown in FIG. 5C (number of white pixels enclosed by ellipse 336) to the total number of tuber mask pixels (total number of white pixels).

The circularity edge-based feature parameter may be determined based on how closely the shape of the tuber mask resembles a circle. For example, processor 172 can determine the circularity parameter value using Equation 4 below—

$$\text{Circularity} = \frac{4\pi \times \text{Area}}{\text{Perimeter}^2} \qquad \text{(Equation 4)}$$

where Area is the area of the tuber mask (e.g., number of tuber mask pixels (e.g., white pixels in FIG. 5C)), and Perimeter is the perimeter of the tuber mask (e.g., number of edge pixels forming the perimeter of the tuber mask).

The convexity defect edge-based feature parameter may be determined based on the deviation of the tuber mask from its convex hull. For the example shown in FIG. 5D, processor 172 can determine the convexity defect parameter value based on deviation 340 of the tuber mask from its convex hull 344.

Referring back to FIGS. 1 to 3, at 216 of method 200, one or more unoccluded tuber depictions may be identified by determining that at least one of the individual tuber depictions is an unoccluded tuber depiction. As shown in FIG. 4A, captured image 304 may depict multiple occluded and unoccluded tubers. A segmented individual tuber depiction may be identified as an unoccluded tuber depiction based on the shape characteristics determined for that individual tuber depiction at 212. For example, processor 172 of control system 116 may identify one or more unoccluded tuber depictions at 216.

The unoccluded tuber depictions may be identified based on binary classification of the segmented individual tuber depictions as fully visible and partially visible tubers. In some embodiments, a threshold-value based sampling approach may be used to identify unoccluded tuber depictions. In other embodiments, a machine-learning based sampling approach may be used to identify the unoccluded tuber depictions. The machine-learning based sampling approach may provide higher classification accuracy compared with the threshold-value based sampling approach.

Any suitable number of unoccluded tuber depictions may be sampled in each image. In some embodiments, a maximum of 1 to 5 unoccluded tuber depictions may be sampled in each image. A smaller sample size may reduce computing resource requirements. In other embodiments, a larger number of unoccluded tuber depictions may be sampled in each image (e.g., a maximum of 5 to 10). Less than the defined maximum number of unoccluded tuber depictions may be sampled where less than the defined maximum number of unoccluded tuber depictions are present in the image. Overall, a higher sample size may provide higher accuracy in determining the average size that is attributed to the harvested tubers but may require higher amount of computing resources.

In the threshold-value based sampling approach, one or more of the shape characteristics may be used as thresholding parameters. The thresholding parameters may be selected based on pre-determined correlation coefficients between the parameter values of the shape characteristics and the response variable (binary classification as occluded/unoccluded). For example, the thresholding parameters may include S/N_1, S/N_2, ellipticalness, circularity, convexity defect and two Hu image moments (H3 and H4). In other examples, different thresholding parameters may be used.

Processor 172 may identify occluded tuber depictions by comparing the determined values for the thresholding parameters with pre-determined threshold values. In some embodiments, the pre-determined threshold values may be based on the mean, range, $25^{th}$, $50^{th}$, and $75^{th}$ percentile values for both fully visible and partially visible tuber classes.

In the machine-learning based sampling approach, any suitable machine learning model may be used. In some embodiments, a trained random forest model may be used. In other embodiments, other trained models may be used, for example, a support vector machine (SVM) or a logistic regression model. The random forest model may provide higher classification accuracy compared with other models for identification of the unoccluded tuber depictions.

In some embodiments, processor 172 may provide a subset of the one or more shape characteristics as input to the selected machine learning model (e.g., a random forest model). The subset of the shape characteristics may be pre-determined based on sequential forward feature selection to identify the features with the highest predictive power. For example, processor 172 may provide parameter values corresponding to convexity defect, ellipse ratio, ellipticalness, circularity, avg_val_bbox, and S/N_1 as inputs to the machine learning model.

Figure 4C:
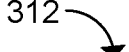
FIG. 4C shows a binary mask for five unoccluded potato depictions identified among individual potato depictions shown in FIG. 4B.
Figure 4C:
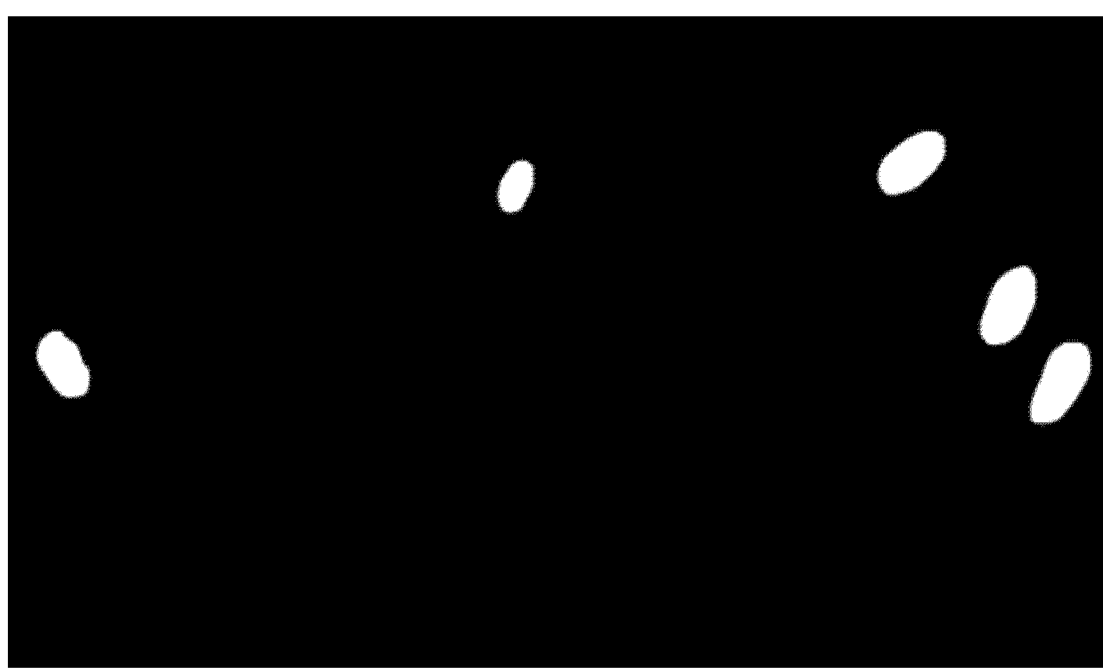

Referring now to FIG. 4C, shown therein is an image 312 providing a graphical illustration of the output generated by the machine learning model. Image 312 shows five unoccluded potato depictions identified among the segmented individual tuber depictions shown in FIG. 4B.

Referring back to FIGS. 1 to 3, at 220 of method 200, a size of tubers corresponding to at least one of the unoccluded tuber depictions (identified at 216) may be measured. For an example embodiment where five unoccluded tuber depictions are identified in each image, processor 172 may measure the size of tubers corresponding to each of the five unoccluded tuber depictions.

The measured size may include at least one of a one-dimensional length, a projected area and a volume. For the example image shown in FIG. 4C, processor 172 may measure a major diameter of an ellipse fitted to each unoccluded potato tuber depiction. In some embodiments, processor 172 may measure a minor diameter of the ellipse or measure both the major and minor diameters.

In some embodiments, processor 172 may measure a projected area of the tuber corresponding to the unoccluded tuber depiction. For example, processor 172 may measure the two-dimensional area corresponding to the tuber mask for each unoccluded potato depiction shown in FIG. 4C.

In some embodiments, processor 172 may measure a volume of the tuber corresponding to the unoccluded tuber depiction. For example, processor 172 may measure the volume based as a volume of a revolution of the projected area of the unoccluded tuber around the major axis of a fitted ellipse.

At 224, an average size may be attributed to at least tubers corresponding to the occluded tuber depictions based on the measured size at 220. For example, processor 172 may attribute an average size to at least tubers corresponding to the occluded tuber depictions based on the measured size at 220.

The average size may be attributed based on the measured size of multiple unoccluded tuber depictions. For example, multiple unoccluded tuber depictions may be measured in each captured image and/or multiple images may be captured of the harvested tubers with each image including one or more measured unoccluded tuber depictions. The average size may be attributed to the tubers corresponding to the occluded tuber depictions in the captured images. The average size may also be attributed to the tubers corresponding to the unoccluded tuber depictions in the captured images and/or to any tubers that were not imaged. For example, the average size may be attributed to a certain number or mass of tubers, or tubers that passed within a certain time period before, between, and/or after the images were captured.

At 228, the storage location of the harvested tubers may be determined based at least in part on bin piler location data. For example, processor 172 may determine the storage location of the harvested tubers based in part on bin piler location data received from location system 120.

The storage location of the harvested tubers can include any suitable data that indicates a physical placement of the harvested tubers. For example, the bin piler may deposit the harvested tubers into bins located inside the storage facility and the determined storage location may include a bin identifier (e.g., identification number). As another example, the storage location may include position coordinates (e.g., two or three dimensional coordinates) within the storage facility or a location identifier (e.g., storage facility quadrant or zone number) associated with the physical location within the storage facility.

The storage location may include data with any suitable level of granularity. For example, the storage location may include x-y coordinate data indicating a floor location within the storage facility. In some examples, the storage location may also include z coordinate data indicating a height within a pile of harvested tubers.

In some embodiments, the storage location of the harvested tubers may be determined based on bin piler location data and one or more movement characteristics of the conveyor. For example, processor 172 may determine the storage location based on bin piler location data received from location system 120, conveyor speed data received from sensors 148, and extendable conveyor segment length data and boom length data received from sensors 121 and location system 120. Processor 172 may use conveyor speed and length data for tracking movement of the harvested tubers from grading station 22 to bin piler 104. The movement tracking may be based on real-time speed and length data received from sensors 148 or a pre-determined transit time associated with movement of a tuber from grading station 22 to bin piler 104. Processor 172 may further track movement of the harvested tubers from bin piler 104 to the storage location based on the bin piler location data received from location system 120. Processor 172 may determine, based on movement characteristics of the conveyor, what average size to attribute to the tubers presently being deposited by the bin piler 104. The transit time between grading station 22 and bin piler 104 may be such that multiple groups of tubers may pass through grading station 22, and each one assigned an average size, before the first of those tuber groups reaches the bin piler 104. In this example, the transit time between grading station 22 and bin piler 104 may be used by processor 172 to determine which of the series of determined average sizes to attribute to the tubers presently being deposited by bin piler 104 (e.g., the average size determined for the group that passed by the grading station 22 one transit time ago).

In some embodiments, the height (i.e. z-coordinate, elevation, or gravity oriented) location of tubers deposited by bin piler 104 may be determined to be a prescribed or measured offset from the z-coordinate location of the discharge end of bin piler 104. For example, bin piler 104 may maintain the discharge end of boom 140 at a programmed height above tubers or the floor below (e.g. automatically using a sensor such as an ultrasonic distance sensor, or manually by an operator) where that height is intended to mitigate damaging the tubers from the fall (e.g. 15 cm or less). In other examples, bin piler 104 may include a sensor 122 (e.g. ultrasonic distance sensor) for sensing the height offset between the discharge end of bin piler 104 and the tubers or floor below. This may allow for an accurate determination of the elevation (e.g. z-coordinate location) where the tubers are being deposited within the storage facility 18.

At 232, the storage location of the harvested tubers and the average size may be recorded in memory. For example, processor 172 may record in memory 152 the storage location of the harvested tubers in association with the average size attributed to the harvested tubers (e.g., as a database entry). The stored information may be provided to one or more users of control system 116. This may permit tubers of the desired grading (e.g., size) to be selectively located and retrieved according to the intended product to make from the tubers (e.g., French fries or potato flakes).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A method of recording a storage location by size for harvested tubers deposited by a bin piler, the method comprising: capturing, using a camera, one or more images of the harvested tubers moving on a conveyor towards the bin piler; segmenting, by a processor, individual tuber depictions visible in the one or more images; determining, by the processor, one or more shape characteristics for a plurality of the individual tuber depictions; identifying, by the processor, one or more unoccluded tuber depictions by determining that at least one of the individual tuber depictions is an unoccluded tuber depiction based on the one or more shape characteristics of that individual tuber depiction, the tuber depictions including occluded tuber depictions; measuring, by the processor, a size of tubers corresponding to at least one of the unoccluded tuber depictions; attributing, by the processor, an average size to at least tubers corresponding to the occluded tuber depictions based on the size of tubers corresponding to the at least one of the unoccluded tuber depictions; determining, by the processor, the storage location of the harvested tubers based at least in part on bin piler location data; and recording in memory the storage location of the harvested tubers and the average size.

Item 2: The method of any preceding item, wherein said segmenting includes deriving a binary mask for each individual tuber depiction using a Mask Region-based Convolutional Neural Network (R-CNN) model.

Item 3: The method of any preceding item, wherein said determining one or more shape characteristics includes at least one of: determining a color-based feature parameter, and an edge-based feature parameter for the binary mask.

Item 4: The method of any preceding item, wherein said identifying the one or more unoccluded tuber depictions includes binary classification of fully and partially visible tuber depictions using a random forest model.

Item 5: The method of any preceding item, wherein the size includes at least one of a volume, a projected area and a one-dimensional length.

Item 6: The method of any preceding item, wherein said measuring includes fitting an external contour of the at least one of the unoccluded tuber depictions with an ellipse and determining a major diameter and a minor diameter of the ellipse.

Item 7: The method of any preceding item, wherein said determining the storage location of the harvested tubers is further based on one or more movement characteristics of the conveyor.

Item 8: The method of any preceding item, wherein the bin piler location data is received from one or more sensors positioned on the bin piler or adjacent to the storage location.

Item 9: The method of any preceding item, wherein the harvested tubers include potatoes.

Item 10: An apparatus for recording a storage location by size for harvested tubers, the apparatus comprising: a bin piler configured to deposit the harvested tubers at the storage location; a conveyor configured to move the harvested tubers towards the bin piler; a camera configured to capture one or more images of the harvested tubers moving on the conveyor; a location system configured to generate bin piler location data indicating a location of the bin piler; and a control system having at least one processor and a memory, the at least one processor configured to collectively: receive the one or more images from the camera; segment individual tuber depictions visible in the one or more images; determine one or more shape characteristics for a plurality of the individual tuber depictions; identify one or more unoccluded tuber depictions by determining that at least one of the individual tuber depictions is an unoccluded tuber depiction based on the one or more shape characteristics of that individual tuber depiction, the tuber depictions including occluded tuber depictions; measure a size of tubers corresponding to at least one of the unoccluded tuber depictions; attribute an average size to at least tubers corresponding to the occluded tuber depictions based on the size of tubers corresponding to the at least one of the unoccluded tuber depictions; determine the storage location of the harvested tubers based at least in part on the bin piler location data; and record in the memory the storage location of the harvested tubers and the average size.

Item 11: The apparatus of any preceding item, wherein said segmenting comprises deriving a binary mask for each individual tuber depiction using a Mask Region-based Convolutional Neural Network (R-CNN) model.

Item 12: The apparatus of any preceding item, wherein said determining the one or more shape characteristics comprises determining at least one of: a color-based feature parameter, and an edge-based feature parameter for the binary mask.

Item 13: The apparatus of any preceding item, wherein said identifying the one or more unoccluded tuber depictions comprises binary classification of fully and partially visible tuber depictions using a random forest model.

Item 14: The apparatus of any preceding item, wherein the size includes at least one of a volume, a projected area, and a one-dimensional length.

Item 15: The apparatus of any preceding item, wherein said measuring comprises fitting an external contour of the at least one of the unoccluded tuber depictions with an ellipse and determining a major diameter and a minor diameter of the ellipse.

Item 16: The apparatus of any preceding item, wherein said determining the storage location of the harvested tubers is further based on one or more movement characteristics of the conveyor.

Item 17: The apparatus of any preceding item, wherein the location system comprises one or more sensors positioned on the bin piler or adjacent to the storage location, the one or more sensors configured to generate the bin piler location data.

Item 18: The apparatus of any preceding item, wherein the harvested tubers include potatoes.

Item 19: A non-transitory computer-readable medium comprising instructions executable by a processor, wherein the instructions when executed configure the processor to: receive, from a camera, one or more images of harvested tubers moving on a conveyor towards a bin piler; segment individual tuber depictions visible in the one or more images; determine one or more shape characteristics for a plurality of the individual tuber depictions; identify one or more unoccluded tuber depictions by determining that at least one of the individual tuber depictions is an unoccluded tuber depiction based on the one or more shape characteristics of that individual tuber depiction, the tuber depictions including occluded tuber depictions; measure a size of tubers corresponding to at least one of the unoccluded tuber depictions; attribute an average size to at least tubers corresponding to the occluded tuber depictions based on the size of tubers corresponding to the at least one of the unoccluded tuber depictions; determine a storage location of the harvested tubers based at least in part on bin piler location data; and record in memory the storage location of the harvested tubers and the average size.

Item 20: The non-transitory computer-readable medium of any preceding item, wherein said segmenting comprises deriving a binary mask for each individual tuber depiction using a Mask Region-based Convolutional Neural Network (R-CNN) model.

Item 21: The non-transitory computer-readable medium of any preceding item, wherein said determining the one or more shape characteristics comprises determining at least one of: a color-based feature parameter, and an edge-based feature parameter for the binary mask.

Item 22: The non-transitory computer-readable medium of any preceding item, wherein said identifying the one or more unoccluded tuber depictions comprises binary classification of fully and partially visible tuber depictions using a random forest model.

Item 23: The non-transitory computer-readable medium of any preceding item, wherein the size includes at least one of a volume, a projected area, and a one-dimensional length.

Item 24: The non-transitory computer-readable medium of any preceding item, wherein said measuring comprises fitting an external contour of the at least one of the unoccluded tuber depictions with an ellipse and determining a major diameter and a minor diameter of the ellipse.

Item 25: The non-transitory computer-readable medium of any preceding item, wherein said determining the storage location of the harvested tubers is further based on one or more movement characteristics of the conveyor.

Item 26: The non-transitory computer-readable medium of any preceding item, wherein the bin piler location data is received from one or more sensors positioned on the bin piler or adjacent to the storage location.

Item 27: The non-transitory computer-readable medium of any preceding item, wherein the harvested tubers include potatoes.

We claim:

1. A method of recording a storage location by size for harvested tubers deposited by a bin piler, the method comprising:

capturing, using a camera, one or more images of the harvested tubers moving on a conveyor towards the bin piler;

segmenting, by a processor, individual tuber depictions visible in the one or more images;

determining, by the processor, one or more shape characteristics for a plurality of the individual tuber depictions;

identifying, by the processor, one or more unoccluded tuber depictions by determining that at least one of the individual tuber depictions is an unoccluded tuber depiction based on the one or more shape characteristics of that individual tuber depiction, the tuber depictions including occluded tuber depictions;

measuring, by the processor, a size of tubers corresponding to at least one of the unoccluded tuber depictions;

attributing, by the processor, an average size to at least tubers corresponding to the occluded tuber depictions based on the size of tubers corresponding to the at least one of the unoccluded tuber depictions;

determining, by the processor, the storage location of the harvested tubers based at least in part on bin piler location data; and recording in memory the storage location of the harvested tubers and the average size.

2. The method of claim 1, wherein said segmenting includes deriving a binary mask for each individual tuber depiction using a Mask Region-based Convolutional Neural Network (R-CNN) model.

3. The method of claim 2, wherein said determining one or more shape characteristics includes at least one of: determining a color-based feature parameter, and an edge-based feature parameter for the binary mask.

4. The method of claim 1, wherein said identifying the one or more unoccluded tuber depictions includes binary classification of fully and partially visible tuber depictions using a random forest model.

5. The method of claim 1, wherein the size includes at least one of a volume, a projected area and a one-dimensional length.

6. The method of claim 1, wherein said measuring includes fitting an external contour of the at least one of the unoccluded tuber depictions with an ellipse and determining a major diameter and a minor diameter of the ellipse.

7. The method of claim 1, wherein said determining the storage location of the harvested tubers is further based on one or more movement characteristics of the conveyor.

8. An apparatus for recording a storage location by size for harvested tubers, the apparatus comprising:

a bin piler configured to deposit the harvested tubers at the storage location;

a conveyor configured to move the harvested tubers towards the bin piler;

a camera configured to capture one or more images of the harvested tubers moving on the conveyor;

a location system configured to generate bin piler location data indicating a location of the bin piler; and a control system having at least one processor and a memory, the at least one processor configured to collectively:

receive the one or more images from the camera;

segment individual tuber depictions visible in the one or more images;

determine one or more shape characteristics for a plurality of the individual tuber depictions;

identify one or more unoccluded tuber depictions by determining that at least one of the individual tuber depictions is an unoccluded tuber depiction based on the one or more shape characteristics of that individual tuber depiction, the tuber depictions including occluded tuber depictions;

measure a size of tubers corresponding to at least one of the unoccluded tuber depictions;

attribute an average size to at least tubers corresponding to the occluded tuber depictions based on the size of tubers corresponding to the at least one of the unoccluded tuber depictions;

determine the storage location of the harvested tubers based at least in part on the bin piler location data; and record in the memory the storage location of the harvested tubers and the average size.

9. The apparatus of claim 8, wherein said segmenting comprises deriving a binary mask for each individual tuber depiction using a Mask Region-based Convolutional Neural Network (R-CNN) model.

10. The apparatus of claim 9, wherein said determining the one or more shape characteristics comprises determining at least one of: a color-based feature parameter, and an edge-based feature parameter for the binary mask.

11. The apparatus of claim 8, wherein said identifying the one or more unoccluded tuber depictions comprises binary classification of fully and partially visible tuber depictions using a random forest model.

12. The apparatus of claim 8, wherein the size includes at least one of a volume, a projected area, and a one-dimensional length.

13. The apparatus of claim 8, wherein said measuring comprises fitting an external contour of the at least one of the unoccluded tuber depictions with an ellipse and determining a major diameter and a minor diameter of the ellipse.

14. The apparatus of claim 8, wherein the location system comprises one or more sensors positioned on the bin piler or adjacent to the storage location, the one or more sensors configured to generate the bin piler location data.

15. A non-transitory computer-readable medium comprising instructions executable by a processor, wherein the instructions when executed configure the processor to:

receive, from a camera, one or more images of harvested tubers moving on a conveyor towards a bin piler;

segment individual tuber depictions visible in the one or more images;

determine one or more shape characteristics for a plurality of the individual tuber depictions;

identify one or more unoccluded tuber depictions by determining that at least one of the individual tuber depictions is an unoccluded tuber depiction based on the one or more shape characteristics of that individual tuber depiction, the tuber depictions including occluded tuber depictions;

measure a size of tubers corresponding to at least one of the unoccluded tuber depictions;

attribute an average size to at least tubers corresponding to the occluded tuber depictions based on the size of tubers corresponding to the at least one of the unoccluded tuber depictions;

determine a storage location of the harvested tubers based at least in part on bin piler location data; and record in memory the storage location of the harvested tubers and the average size.

16. The non-transitory computer-readable medium of claim 15, wherein said segmenting comprises deriving a binary mask for each individual tuber depiction using a Mask Region-based Convolutional Neural Network (R-CNN) model.

17. The non-transitory computer-readable medium of claim 16, wherein said determining the one or more shape characteristics comprises determining at least one of:

a color-based feature parameter, and an edge-based feature parameter for the binary mask.

18. The non-transitory computer-readable medium of claim 15, wherein said identifying the one or more unoccluded tuber depictions comprises binary classification of fully and partially visible tuber depictions using a random forest model.

19. The non-transitory computer-readable medium of claim 15, wherein said determining the storage location of the harvested tubers is further based on one or more movement characteristics of the conveyor.

20. The non-transitory computer-readable medium of claim 15, wherein the instructions when executed further configure the processor to receive the bin piler location data from one or more sensors positioned on the bin piler or adjacent to the storage location.

\* \* \* \* \*